US010933469B2

United States Patent
Mittendorf et al.

(10) Patent No.: US 10,933,469 B2
(45) Date of Patent: Mar. 2, 2021

(54) METHOD OF FORMING AN ABRASIVE NICKEL-BASED ALLOY ON A TURBINE BLADE TIP

(71) Applicant: HONEYWELL INTERNATIONAL INC., Morris Plains, NJ (US)

(72) Inventors: Don Mittendorf, Mesa, AZ (US); Vladimir K Tolpygo, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 464 days.

(21) Appl. No.: 16/126,222

(22) Filed: Sep. 10, 2018

(65) Prior Publication Data

US 2020/0078867 A1   Mar. 12, 2020

(51) Int. Cl.
  *B22F 5/04* (2006.01)
  *B23K 26/21* (2014.01)
  *B22F 9/08* (2006.01)
  *B22F 3/24* (2006.01)

(52) U.S. Cl.
  CPC .............. *B22F 5/04* (2013.01); *B22F 9/08* (2013.01); *B23K 26/21* (2015.10); *B22F 2003/242* (2013.01); *B22F 2003/248* (2013.01); *B22F 2301/15* (2013.01); *B22F 2302/40* (2013.01); *B22F 2303/20* (2013.01)

(58) Field of Classification Search
  CPC ............... B22F 5/04; B22F 9/08; B23K 26/21
  See application file for complete search history.

(56) References Cited

U.S. PATENT DOCUMENTS

| 4,152,488 | A | 5/1979 | Schilke et al. |
| 4,610,698 | A | 9/1986 | Eaton et al. |
| 4,884,820 | A | 12/1989 | Jackson et al. |
| 5,264,011 | A | 11/1993 | Brown et al. |
| 5,359,770 | A | 11/1994 | Brown et al. |
| 5,366,695 | A | 11/1994 | Erickson |
| 5,395,584 | A | 3/1995 | Berger et al. |
| 5,484,665 | A | 1/1996 | Singh et al. |
| 5,486,281 | A | 1/1996 | Gruver et al. |
| 5,622,638 | A | 4/1997 | Schell et al. |
| 5,705,281 | A | 1/1998 | Reeves et al. |

(Continued)

FOREIGN PATENT DOCUMENTS

| EP | 0683239 A1 | 5/1994 |
| EP | 0837222 A1 | 4/1998 |

(Continued)

OTHER PUBLICATIONS

EP Search Report, EP 13187625.2-1353 dated Mar. 18, 2014.

(Continued)

*Primary Examiner* — Jessee R Roe
(74) *Attorney, Agent, or Firm* — Lorenz & Kopf, LLP

(57) ABSTRACT

A method of forming an abrasive nickel-based alloy on a turbine blade tip includes producing or obtaining a metal powder that is mixed with a carbon powder to form a carbon-enriched metal powder. The metal powder includes a refractory element. The method further includes bonding the carbon-enriched metal powder to the turbine blade tip. The step of bonding includes raising the temperature of the carbon-enriched metal powder past its melting point, thereby causing the carbon to combine with the refractory elements to form abrasive carbide particles.

20 Claims, 3 Drawing Sheets

(56) References Cited

U.S. PATENT DOCUMENTS

| | | |
|---|---|---|
| 7,316,850 B2 | 1/2008 | Hu et al. |
| 7,435,049 B2 | 10/2008 | Ghasripoor et al. |
| 9,341,066 B2 | 5/2016 | Bintz et al. |
| 2005/0194363 A1 | 9/2005 | Hu et al. |
| 2005/0224144 A1 | 10/2005 | Pollock et al. |
| 2005/0238526 A1 | 10/2005 | Schall |
| 2006/0042172 A1 | 3/2006 | Sung |
| 2006/0219330 A1 | 10/2006 | Hu et al. |
| 2006/0239852 A1 | 10/2006 | Shipton et al. |
| 2009/0117282 A1 | 5/2009 | Arikawa et al. |
| 2009/0123290 A1 | 5/2009 | Imano et al. |
| 2009/0196760 A1 | 8/2009 | Harada et al. |
| 2009/0252613 A1 | 10/2009 | Gorman et al. |
| 2010/0012235 A1 | 1/2010 | Gleeson et al. |
| 2010/0098551 A1 | 4/2010 | Hanrieder et al. |
| 2010/0279148 A1 | 11/2010 | Hu |
| 2011/0097599 A1 | 4/2011 | Hu |
| 2011/0103968 A1 | 5/2011 | Hoebel et al. |
| 2014/0134353 A1 | 5/2014 | Mittendorf |
| 2016/0032735 A1 | 2/2016 | McCaffrey et al. |
| 2016/0069195 A1 | 3/2016 | Hewitt et al. |

FOREIGN PATENT DOCUMENTS

| | | |
|---|---|---|
| EP | 1201778 A2 | 5/2002 |
| EP | 1930455 A1 | 6/2008 |
| EP | 2110449 A1 | 10/2009 |
| EP | 2946866 A2 | 11/2015 |
| GB | 2378733 A | 2/2003 |

OTHER PUBLICATIONS

EP Communication, EP 13 187 625.2-1353 dated Apr. 8, 2014.

AGARD—Seal Technology In Gas Turbine Engines; Papers presented at the Propulsion and Energetics Panel's 5 1st (B) Specialists' Meeting In London, United KIngdozn Apr. 6-7, 1978.

METHOD OF FORMING AN ABRASIVE NICKEL-BASED ALLOY ON A TURBINE BLADE TIP

STATEMENT REGARDING FEDERALLY SPONSORED RESEARCH OR DEVELOPMENT

This invention was made with Government support under DTFAWA-15-A-80017 awarded by the Federal Aviation Administration. The Government has certain rights in this invention.

TECHNICAL FIELD

The present disclosure generally relates to turbine engine technologies. More particularly, the present disclosure relates to a method of forming an abrasive nickel-based alloy on a turbine blade tip.

BACKGROUND

Turbine engines are used as the primary power source for various kinds of vehicles, such as aircraft. Turbine engines are also used as auxiliary power sources that drive air compressors, hydraulic pumps, and industrial gas turbine (IGT) power generation. Furthermore, the power from turbine engines may be used for stationary power supplies such as backup electrical generators and the like.

Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Turbine engines use the power created by the rotating turbine disk to power a bladed compressor that draws more air into the engine and to energize fan blades, propellers, electrical generators, or other devices, depending on the type of turbine engine.

Because turbine engines provide power for many primary and secondary functions, it is important to optimize the operating efficiency of compressors and turbines. One way to maximize compressor and turbine efficiency is to minimize high-pressure air leakage between the tips of the blades and the adjacent shroud. In order to accomplish this objective, compressor or turbine blade dimensions are tightly controlled and blade tips can be machined so the installed blades span a diameter that is just slightly smaller than the shroud inner diameter. Improvements in compressor or turbine performance are possible when compressor or turbine blade tips can tolerate interference rubs with the adjacent shroud without experiencing significant blade tip wear. That is, wear of blade tips during a rub is undesirable because clearances increase, producing an associated reduction in compressor or turbine performance.

The prior art contains examples of attempted solutions to this rubbing problem by using abrasive particles embedded in the blade tip. For example, U.S. Pat. No. 5,704,759 discloses a turbine blade body having a tip portion that is coated with an abrasive material. The abrasive material includes a dispersion of discrete particles of cubic boron nitride (CBN) that are formed on the blade tip by an entrapment plating method wherein the CBN particles are entrapped in electroplated nickel with their tips (cutting edges) exposed. However, experience has shown that these abrasive tips are not durable for long-term engine use, at least in part due to limitations in the blade tip design as a result of the fabrication techniques employed.

Accordingly, it would be desirable to provide an improved method of forming an abrasive nickel-based alloy on a turbine blade tip. The method would desirably avoid fabrication methods that limit the design of the blade tip. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to a method of forming an abrasive nickel-based alloy on a turbine blade tip. As such, in one exemplary embodiment, a method of forming an abrasive nickel-based alloy on a turbine blade tip includes producing or obtaining a metal powder that is mixed with a carbon powder to form a carbon-enriched metal powder. The metal powder includes a refractory element. The method further includes bonding the carbon-enriched metal powder to the turbine blade tip. The step of bonding includes raising the temperature of the carbon-enriched metal powder past its melting point, thereby causing the carbon to combine with the refractory elements to form abrasive carbide particles.

In another exemplary embodiment, a method of forming an abrasive nickel-based alloy on a turbine blade tip includes producing or obtaining a turbine blade including the turbine blade tip. The turbine blade includes a nickel-based superalloy. The method further includes producing or obtaining a metal powder that is mixed with a carbon powder to form a carbon-enriched metal powder. The metal powder includes a nickel-based superalloy and further includes a refractory element selected from the group consisting of tungsten, tantalum, titanium, and a mixture of two or more thereof. The metal and ceramic powder mixture has a weight ratio of metal powder to carbon powder of from about 100:1 to about 20:1. The method further includes bonding the carbon-enriched metal powder to the turbine blade tip. The step of bonding includes raising the temperature of the carbon-enriched metal powder past its melting point, thereby causing the carbon to combine with the refractory elements to form abrasive carbide particles. Bonding the carbon-enriched metal powder is performed using a laser deposition process or an electron-beam welding process.

In yet another exemplary embodiment, a method of forming an abrasive nickel-based alloy on a turbine blade tip includes producing or obtaining a turbine blade including the turbine blade tip. The turbine blade includes a nickel-based superalloy. The method further includes producing or obtaining a metal powder that is mixed with a carbon powder to form a carbon-enriched metal powder. The metal powder includes a nickel-based superalloy and further includes a refractory element selected from the group consisting of tungsten, tantalum, titanium, and a mixture of two or more thereof. The metal and ceramic powder mixture has a weight ratio of metal powder to carbon powder of from about 50:1 to about 25:1. A variance between the mean particle size (d50) of the metal powder as compared with the mean particle size (d50) of the carbon powder is +/−25%. The method further includes bonding the carbon-enriched metal powder to the turbine blade tip. The step of bonding includes raising the temperature of the carbon-enriched metal powder past its melting point, thereby causing the carbon to combine with the refractory elements to form abrasive carbide particles. Bonding the carbon-enriched metal powder is performed using a laser deposition process or an electron-beam welding process. Still further, the method includes performing a finishing process on the turbine blade after the step of bonding. The finishing process is selected from the group consisting of: heat treating, machining, surface finishing, polishing, and coating.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any alloy embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. As further used herein, the word "about" means a possible variance (+/−) of the stated value of up to 10%, or alternatively up to 5%, or no variance at all. Furthermore, there is no intention to be bound by any expressed or implied theory presented in the preceding technical field, background, brief summary, or the following detailed description.

The present disclosure generally provides embodiments of a method of forming an abrasive nickel-based alloy on a turbine blade tip. In accordance with these embodiments, a metal powder is prepared using an atomization process. The metal powder is an alloy that is suitable for use in a turbine blade, such as (but not limited to) a nickel-based superalloy. The metal powder includes refractory elements, such as tungsten, titanium, and/or tantalum. An amount of carbon in then mixed into the metal powder. The carbon-enriched metal powder is then bonded to the turbine blade tip using laser deposition, electron-beam welding, or any other technique that causes the carbon-enriched metal powder to melt on the turbine blade tip. During the melting of the carbon-enriched metal powder, there is a thermodynamic tendency of the carbon to combine with the refractory elements to form carbide particles. These carbide particles are very hard, and they can serve as abrasives to aid the blade tip when rubbing against the shroud.

Turbine Blade

Figure 1:
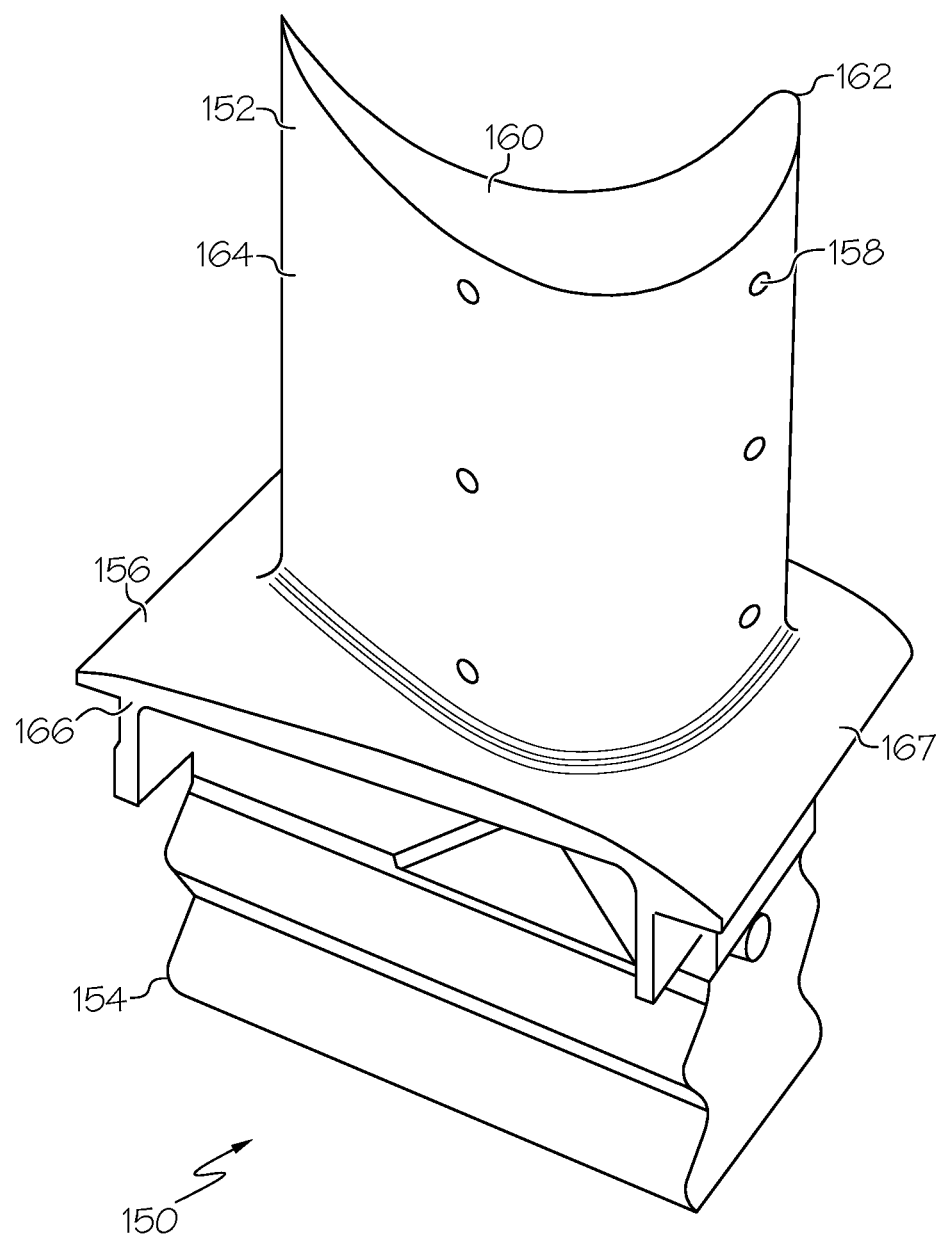
FIG. 1 is a perspective view of a blade for a turbine according to an embodiment of the present disclosure.

Turning now to FIG. 1, an exemplary turbine blade 150 is illustrated. The turbine blade 150 is exemplary of the type of turbine blades that are used in the turbine engines. Turbine blades commonly have a different shape, dimension, and size depending on gas turbine engine models and applications. In a typical turbine engine, multiple turbine blades 150 are positioned in adjacent circumferential position along a hub or rotor disk. The turbine blades are typically made from advanced superalloys such as IN713, IN738, IN792, MarM247, GTD111, Rene142, Rene N5, SC180, and CMSX4 to name several non-exclusive examples.

The turbine blade 150 includes an airfoil 152. The airfoil 152 includes a concave curvature face and a convex face. In operation, hot gases impinge on the airfoil 152 concave face and thereby provide the driving force for the turbine engine. The airfoil 152 includes a leading edge 162 and a trailing edge 164 that firstly and lastly encounter an air stream passing around airfoil 152. The blade 150 also includes a tip 160. In some applications the tip may include raised features commonly known as squealers.

The turbine blade 150 may be mounted on a turbine disk that is part of a non-illustrated wheel. The blade 150 is attached to the disk by a fir tree or dovetail attachment 154 that extends downwardly from the airfoil 152 and engages a non-illustrated slot on the turbine wheel. A platform 156 extends longitudinally outwardly from the area where the airfoil 152 is joined to the attachment 154. A number of cooling channels desirably extend through the interior of the airfoil 152, ending in openings 158 in the airfoil surface.

Tip Alloy Composition

In accordance with the present disclosure, for the turbine blade tip, a metal powder is prepared using an atomization process. The metal powder is an alloy that is suitable for use in a turbine blade, such as (but not limited to) a nickel-based superalloy. Within the scope of nickel-based superalloys, some compositions have proven particularly effective for turbine blade tips. For example, U.S. Patent Application Publication 2014/0134353 discloses a nickel-based superalloy that includes, by weight, about 1.5% to about 5.5% chromium, about 8% to about 12% aluminum, about 4% to about 8% tantalum, about 1.5% to about 5.5% tungsten, less than about 1% of one or more of elements selected from a group consisting of boron, zirconium, yttrium, hafnium, and silicon, and a balance of nickel. The '353 Publication discloses that this alloy may be laser-welded onto the tip region of a turbine blade.

In another example, U.S. Patent Application Publication 2011/0135489 discloses a nickel-based superalloy that includes, by weight, about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel. The '489 Publication discloses that this alloy may be cast into the shape of a blade tip, and then diffusion bonded onto a turbine blade.

Of course, other nickel-based superalloys may be suitable for use as a turbine blade tip material of the present disclosure; the foregoing examples are intended to provide but a sampling of the possible alloy compositions.

As initially noted, a metal alloy as described above is prepared in the form of a powder using an atomization process. As further noted, the metal powder includes refractory elements, such as tungsten, titanium, and/or tantalum.

Thereafter, the metal powder is mixed with an amount of carbon. The carbon may be provided in powdered form, having a similar particle size mean diameter (d50) to the particles of the metal powder (e.g., a variance of +/−25%, or +/−10%). The carbon powder may be mixed with the metal powder at a suitable weight ratio such that, upon melting, there is a thermodynamic tendency in the melted, carbon-enriched alloy to form hard carbides with the refractory elements. This may be a weight ratio of the metal powder to the carbon powder of about 100:1 to about 20:1, such as about 50:1 to about 25:1.

Bonding the Alloy to the Blade Tip

As noted above, after forming the carbon-enriched metal powder, the carbon-enriched metal powder is bonded to the turbine blade tip using laser deposition, electron-beam welding, or any other technique that causes the carbon-enriched metal powder to melt on the turbine blade tip. During the melting of the carbon-enriched metal powder, there is a thermodynamic tendency of the carbon to combine with the refractory elements to form carbide particles. These carbide particles are very hard, and they can serve as abrasives to aid the blade tip when rubbing against the shroud.

Figure 2:
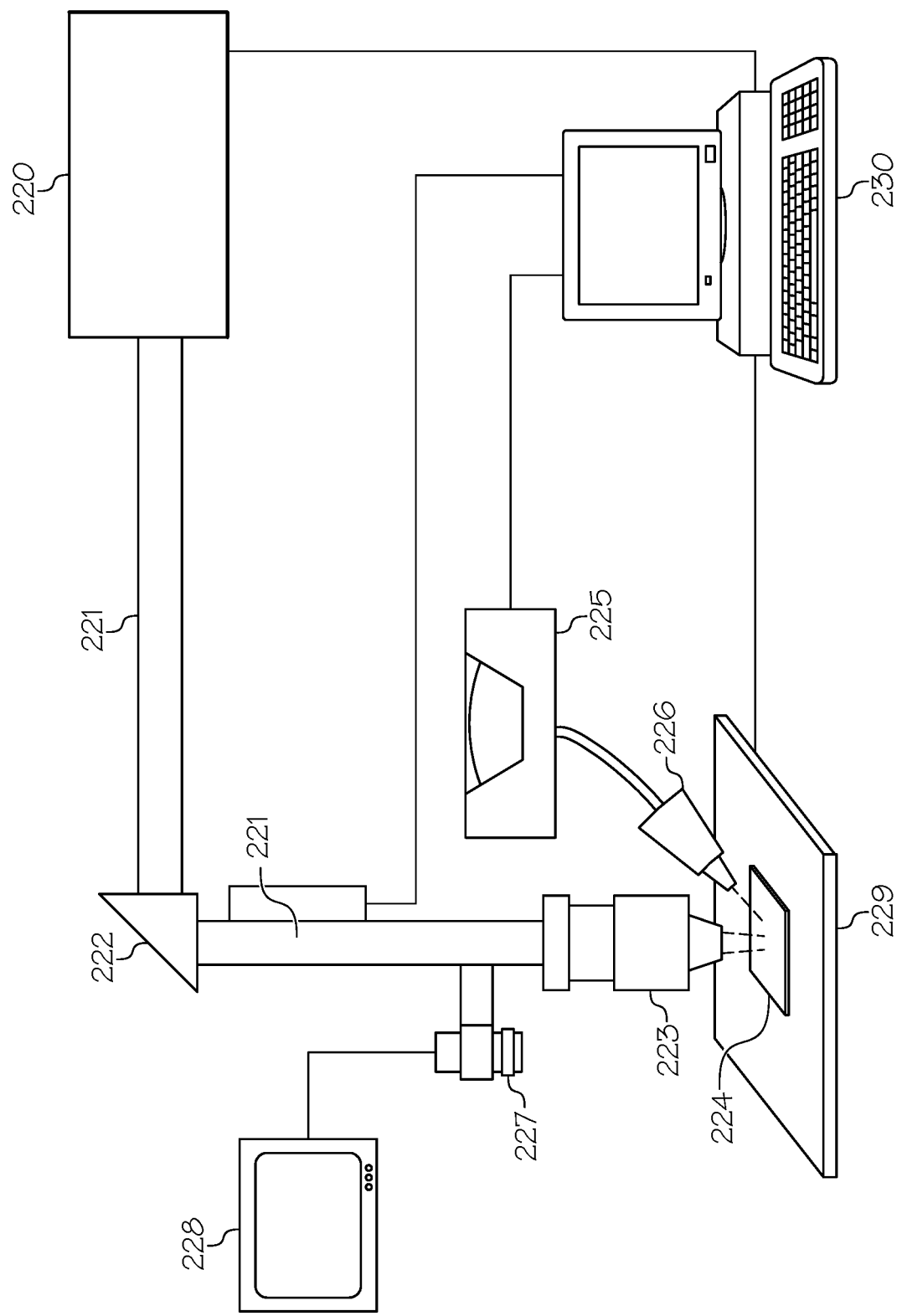
FIG. 2 is a schematic representation of the equipment and apparatus that may be used to perform laser deposition welding in accordance with an embodiment of the present disclosure.

Laser deposition (welding) will be described herein as a suitable melting process; however, this description should not be considered limited or exclusive of other possible processes. Referring now to FIG. 2 there is shown a schematic diagram of a general apparatus for laser generation and control that may be used for laser welding according to an embodiment of this disclosure. Laser generating means 220 generates a laser used in the welding system. A laser is directed through typical laser powder fusion welding equipment which may include beam guide 221, mirror 222, and focus lens 223. The laser then impinges on a surface of the workpiece 224 (i.e., a turbine blade). Components such as beam guide 221, mirror 222, and focus lens 223 are items known in the art of laser welding. Beam guide 221 may include fiber optic materials such as optic fiber laser transmission lines. Furthermore, with certain laser types a laser may be directed onto workpiece 224 through an optic fiber line.

The carbon-enriched metal powder may be provided in powder feeder 225. In such an embodiment, the powder is fed onto the workpiece through powder feed nozzle 226. A coaxial or off-axis arrangement may be used with powder feed nozzle 226 with respect to the main laser.

Other components of the system include vision camera 227 and video monitor 228. The image taken by the camera can also be fed-back to the controller screen for positioning and welding programming. The workpiece 224 is held on a work table 229. An inert gas shield (not shown) is fed through guides (not shown) onto the workpiece 224. The inert gas shield is directed onto a portion of the surface of the workpiece 224 during laser welding.

Controller 230 may be a computer numerically controlled (CNC) positioning system. CNC controller 230 coordinates components of the system. As is known in the art the controller may also include a digital imaging system. The controller guides movement of the laser and powder feed across the face of the workpiece 224. In a preferred embodiment, movement of the workpiece in the XY plane is achieved through movement of the worktable 229. Movement in the up and down, or Z-direction is achieved by control of the laser arm; i.e., pulling it up or lowering it.

In a preferred embodiment, the power of the laser is between about 50 to about 2500 watts and more preferably between about 50 to about 1500 watts. The powder feed rate of powder filler material is between about 1.5 to about 20 grams per minute and more preferably about 1.5 to about 10 grams per minute. Traveling speed for relative motion of the substrate positioning table 229 relative to the laser beam is about 5 to about 22 inches per minute and more preferably about 5 to about 14 inches per minute. The size of the main spot cast by the laser onto the work surface is about 0.02 to about 0.1 inches in diameter and more preferably about 0.04 to about 0.06 inches. The laser-welded bead width that results through the laser is thus about 0.02 to about 0.100 inches and more preferably about 0.04 to about 0.06 inches in width.

In this manner, the blade tip can be provided with the abrasive alloy of the present disclosure within virtually unlimited design constraints. Namely, because it is the melting of the carbon-enriched metal powder (and subsequent solidification) that causes the hard carbides to form, the act of laser welding itself creates the carbide particles. Thus, any design shape that can be produced by the laser can also include the hard carbide particles. The blade tip design may thus be optimized for any turbine engine configuration.

Once the alloy of the present disclosure is bonded on to the blade tip, the turbine blade may be finished using convention processes. These processes may include, but are not limited to, further heat treatments, machining, and surface finishing treatments such as polishing and coatings.

Method

Figure 3:
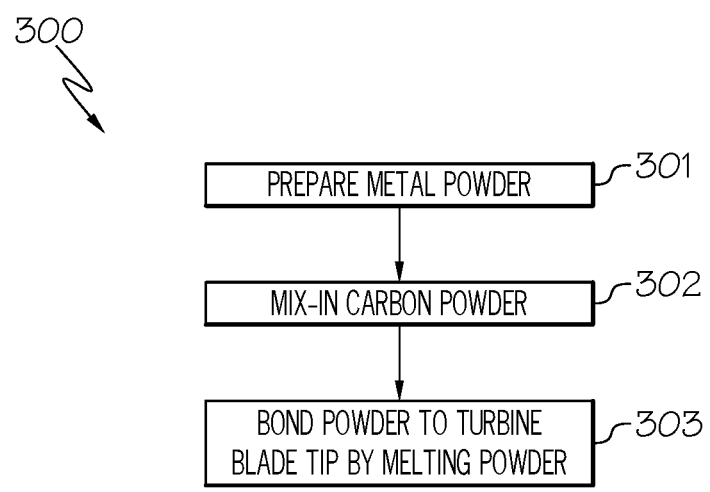
FIG. 3 is a flowchart illustrating a method of forming an abrasive nickel-based alloy on a turbine blade tip in accordance with an embodiment of the present disclosure.

In accordance with the foregoing, a method 300 of forming an abrasive nickel-based alloy on a turbine blade tip. is illustrated in FIG. 3. At step 301, a metal powder is prepared using an atomization process. The metal powder is an alloy that is suitable for use in a turbine blade, such as (but not limited to) a nickel-based superalloy. The metal powder includes refractory elements, such as tungsten, titanium, and/or tantalum. At step 302, an amount of carbon in mixed into the metal powder. At step 303, the carbon-enriched metal powder is bonded to the turbine blade tip using laser deposition, electron-beam welding, or any other technique that causes the carbon-enriched metal powder to melt on the turbine blade tip. During the melting of the carbon-enriched metal powder, there is a thermodynamic tendency of the carbon to combine with the refractory elements to form carbide particles. These carbide particles are very hard, and they can serve as abrasives to aid the blade tip when rubbing against the shroud. The method 300 may contain additional steps not recited herein. The method 300 may have the method steps performed in an alternative order than as described.

As such, the present disclosure has provided embodiments of an improved method of forming an abrasive nickel-based alloy on a turbine blade tip. The method desirably avoids fabrication methods that limit the design of the blade tip by bonding the abrasive alloy to the tip using a melting technique (such as laser welding) that can accommodate virtually any design, where it is the step of melt itself (and subsequent re-solidification) of the alloy that causes the abrasive particles to be formed there-within and distributed throughout.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of forming an abrasive nickel-based alloy on a turbine blade tip, comprising:
   producing or obtaining a metal powder that is mixed with a carbon powder to form a carbon-enriched metal powder, wherein the metal powder comprises a refractory element; and
   bonding the carbon-enriched metal powder to the turbine blade tip, wherein the step of bonding comprises raising the temperature of the carbon-enriched metal powder past its melting point, thereby causing the carbon to combine with the refractory elements to form abrasive carbide particles.

2. The method of claim 1, wherein the metal powder is produced using an atomization process.

3. The method of claim 1, wherein the metal powder comprises a nickel-based superalloy.

4. The method of claim 3, wherein the refractory element is selected from the group consisting of: tungsten, tantalum, titanium, and a mixture of two or more thereof.

5. The method of claim 3, wherein the nickel-based superalloy comprises, by weight: about 1.5% to about 5.5% chromium, about 8% to about 12% aluminum, about 4% to about 8% tantalum, about 1.5% to about 5.5% tungsten, less than about 1% of one or more elements selected from a group consisting of boron, zirconium, yttrium, hafnium, and silicon, and a balance of nickel.

6. The method of claim 3, wherein the nickel-based superalloy comprises, by weight: about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel.

7. The method of claim 1, wherein a variance between the mean particle size (d50) of the metal powder as compared with the mean particle size (d50) of the carbon powder is +/−25%.

8. The method of claim 7, wherein a variance between the mean particle size (d50) of the metal powder as compared with the mean particle size (d50) of the carbon powder is +/−10%.

9. The method of claim 1, wherein the metal and ceramic powder mixture has a weight ratio of metal powder to carbon powder of from about 100:1 to about 20:1.

10. The method of claim 9, wherein the metal and ceramic powder mixture has a weight ratio of metal powder to carbon powder of from about 50:1 to about 25:1.

11. The method of claim 1, wherein bonding the carbon-enriched metal powder is performed using a laser deposition process.

12. The method of claim 1, wherein the laser deposition process produces a melted powder bead width of about 0.02 to about 0.100 inches.

13. The method of claim 1, wherein the laser deposition process produces a melted powder bead width of about 0.04 to about 0.06 inches in width.

14. The method of claim 1, wherein bonding the carbon-enriched metal powder is performed using an electron-beam welding process.

15. The method of claim 1, wherein the turbine blade comprises a nickel-based superalloy.

16. The method of claim 1, further comprising performing a finishing process on the turbine blade after the step of bonding, wherein the finishing process is selected from the group consisting of: heat treating, machining, surface finishing, polishing, and coating.

17. A method of forming an abrasive nickel-based alloy on a turbine blade tip, comprising:
   producing or obtaining a turbine blade comprising the turbine blade tip, wherein the turbine blade comprises a nickel-based superalloy;
   producing or obtaining a metal powder that is mixed with a carbon powder to form a carbon-enriched metal powder, wherein the metal powder comprises a nickel-based superalloy and further comprises a refractory element selected from the group consisting of tungsten, tantalum, titanium, and a mixture of two or more thereof, and wherein the metal and ceramic powder mixture has a weight ratio of metal powder to carbon powder of from about 100:1 to about 20:1; and
   bonding the carbon-enriched metal powder to the turbine blade tip, wherein the step of bonding comprises raising the temperature of the carbon-enriched metal powder past its melting point, thereby causing the carbon to combine with the refractory elements to form abrasive carbide particles, wherein bonding the carbon-enriched metal powder is performed using a laser deposition process or an electron-beam welding process.

18. The method of claim 17, wherein a variance between the mean particle size (d50) of the metal powder as compared with the mean particle size (d50) of the carbon powder is +/−25%.

19. The method of claim 17, wherein the metal and ceramic powder mixture has a weight ratio of metal powder to carbon powder of from about 50:1 to about 25:1.

20. A method of forming an abrasive nickel-based alloy on a turbine blade tip, comprising:
   producing or obtaining a turbine blade comprising the turbine blade tip, wherein the turbine blade comprises a nickel-based superalloy;
   producing or obtaining a metal powder that is mixed with a carbon powder to form a carbon-enriched metal powder, wherein the metal powder comprises a nickel-based superalloy and further comprises a refractory element selected from the group consisting of tungsten, tantalum, titanium, and a mixture of two or more thereof, wherein the metal and ceramic powder mixture has a weight ratio of metal powder to carbon powder of from about 50:1 to about 25:1, and wherein a variance between the mean particle size (d50) of the metal powder as compared with the mean particle size (d50) of the carbon powder is +/−25%;
   bonding the carbon-enriched metal powder to the turbine blade tip, wherein the step of bonding comprises raising the temperature of the carbon-enriched metal powder past its melting point, thereby causing the carbon to combine with the refractory elements to form abrasive carbide particles, wherein bonding the carbon-enriched metal powder is performed using a laser deposition process or an electron-beam welding process; and
   performing a finishing process on the turbine blade after the step of bonding, wherein the finishing process is selected from the group consisting of: heat treating, machining, surface finishing, polishing, and coating.

* * * * *